United States Patent
Uchiyama et al.

[11] Patent Number: 6,072,292
[45] Date of Patent: Jun. 6, 2000

[54] CONTROL FOR ELECTRIC MOTOR OPERATED VEHICLE

[75] Inventors: Atsushi Uchiyama; Hiroshi Tanaka, both of Iwata, Japan

[73] Assignee: Yamaha Hatsudoki Kabushiki Kaisha, Iwata, Japan

[21] Appl. No.: 09/042,145

[22] Filed: Mar. 13, 1998

[51] Int. Cl.[7] ........................................ H02P 3/14
[52] U.S. Cl. .................. 318/376; 318/366; 318/139
[58] Field of Search .................... 318/362–381, 318/139

[56] References Cited

U.S. PATENT DOCUMENTS

| | | | |
|---|---|---|---|
| 4,090,114 | 5/1978 | Thompson | 318/139 |
| 4,489,256 | 12/1984 | Brodsky | 318/87 |
| 4,500,820 | 2/1985 | Shotaro et al. | 318/139 |
| 4,634,941 | 1/1987 | Klimo | 318/139 |
| 5,319,292 | 6/1994 | Backstrand | 318/139 |
| 5,384,522 | 1/1995 | Toriyama et al. | 318/371 |
| 5,644,202 | 7/1997 | Toriyama et al. | 318/369 |
| 5,951,115 | 9/1999 | Sakai et al. | 303/3 |

FOREIGN PATENT DOCUMENTS 4-49321  8/1992  Japan .

OTHER PUBLICATIONS

European Search Report dated Aug. 14, 1998.
Patent Abstracts of Japan, vol. 012, No. 269 (M–723), Jul. 27, 1988 & JP 63 052602 A (Toyota Motor Corp), Mar. 5, 1988.
Patent Abstracts of Japan, vol. 097, No. 007, Jul. 31, 1997 & JP 09 075932 A (Yamaha Motor Co Ltd) Mar. 25, 1997.
Patent Abstracts of Japan, vol. 095, No. 008, Sep. 29, 1995 & JP 07 125963 A (Hitachi Ltd) May 16, 1995.

*Primary Examiner*—David Martin
*Attorney, Agent, or Firm*—Knobbe, Martens, Olson & Bear LLP

[57] ABSTRACT

A number of embodiments of electric motor controls for electric power assisted vehicles. The controls all provide for regenerative braking to be automatically enabled upon the sensing of a failure in the control system. The regenerative braking is, however, discontinued once the vehicle stops so that it can be easily pushed by hand without drag from the electric motor.

13 Claims, 3 Drawing Sheets

CONTROL FOR ELECTRIC MOTOR OPERATED VEHICLE

BACKGROUND OF THE INVENTION

This invention relates to a control for an electric motor-operated vehicle, and more particularly to an improved control that allows regenerative braking and a control for such regenerative braking.

The use of electric motors for providing either the primary motive power or auxiliary, assist motive power for a wide variety of vehicles have been proposed. It has been acknowledged that in such vehicles, the electric motor may also be employed as a way of obtaining a braking effect for the vehicle. Since the motor will be driven when the vehicle is being decelerated and electric power is not being supplied to the motor, it can be utilized as a generator and this generating effect can be utilized for regenerative braking. Thus, many vehicles having such electric motor propulsion systems also employ regenerative braking.

Normally, the regenerative braking system requires some operator input for actuating the braking mechanism. It may be desirable, however, to provide that the regenerative braking is automatically applied under a wide variety of different types of circumstances.

It is, therefore, a principal object of this invention to provide an improved electric motor propulsion system for a vehicle that employs regenerative braking and wherein the braking effect is automatically applied in response to certain conditions.

It is a further object of this invention to provide an improved electric motor control for an electric motor driven vehicle wherein the system employs a regenerative braking system that is automatically applied in the event of some failure in the control system so as to bring the vehicle to a halt.

One difficulty in connection with the use of regenerative braking in electric motor powered vehicles is that the vehicle then becomes difficult to push manually. It is frequently the situation where the electric motor propulsion, be at either of the full power or of the assist power type, is employed in a vehicle that may be manually pushed. For example, this type of propulsion system is frequently utilized in vehicles such as bicycles, wheelchairs, or other small vehicles that may, from time to time, require manual pushing. The drag caused by the regenerative braking can, however, cause difficulty in pushing the vehicle.

It is, therefore, a still further object of this invention to provide an improved electric motor control system for an electric power driven vehicle that embodies regenerative braking and wherein the braking system is disabled automatically during conditions when the vehicle may be desired to be pushed.

This result can be achieved by providing a clutch mechanism between the driving motor and the propulsion device of the vehicle. However, when this is done, then the operator need disengage the clutch in order to facilitate the pushing operation. If the vehicle is of the wheelchair type, there may be a separate motor for each driving wheel and thus there will be required a clutch and operator for each wheel. This is obviously not only disadvantageous and inconvenient, but adds to the cost.

It is, therefore, a still further object to this invention to provide an improved control system for an electric motor driven vehicle having a regenerative braking system wherein the braking system is automatically disabled under conditions when the vehicle may be pushed so as to avoid the necessity of utilizing a clutch in the transmission between the motor and the vehicle propulsion device.

As has been noted, it may be desirable employ an arrangement wherein the regenerative braking system is automatically engaged in response to some sense condition such as a failure in the control circuit. Where this is done, however, once the vehicle is stopped it also may be necessary or desirable to push it. If the regenerative braking system is engaged under the aforenoted condition, then the pushing again may be difficult.

It is, therefore, a still further object of this invention to provide an improved electric motor control for an electric motor power vehicle wherein there is provide a regenerative braking system that is automatically engaged for braking the vehicle in response to a sensed condition and wherein the regenerative braking system is disabled once the vehicle has stopped so as to facilitate its pushing.

SUMMARY OF THE INVENTION

The features of this invention are adapted to be embodied in a motor control for an electrically power driven vehicle that comprises an electrical power source and a propulsion device. An electric motor is provided for powering the propulsion device of the vehicle for applying a driving force to the propulsion device. A control selectively couples the electric motor and the electric power source in a first driving mode for powering the electrical motor to drive the propulsion device and a regenerative braking mode for generating a regenerative braking against the movement of the vehicle.

In accordance with a first feature of the invention, a motor control system as described in the preceding paragraph includes means for sensing a malfunction in the control and for automatically switching the electric motor to the regenerative braking mode upon the sensing of such a failure.

In accordance with another feature of the invention, the control is effective to disable the regenerative braking mode when the vehicle comes to a halt so as to facilitate its pushing.

In accordance with another feature of the invention, a switch is provided for switching the condition between the driving mode and the regenerative braking mode and that switch is placed in the regenerative braking mode in response to a predetermined condition and is thereafter switched out of the regenerative braking mode when the vehicle stops.

DETAILED DESCRIPTION OF THE PREFERRED EMBODIMENTS

Figure 1:
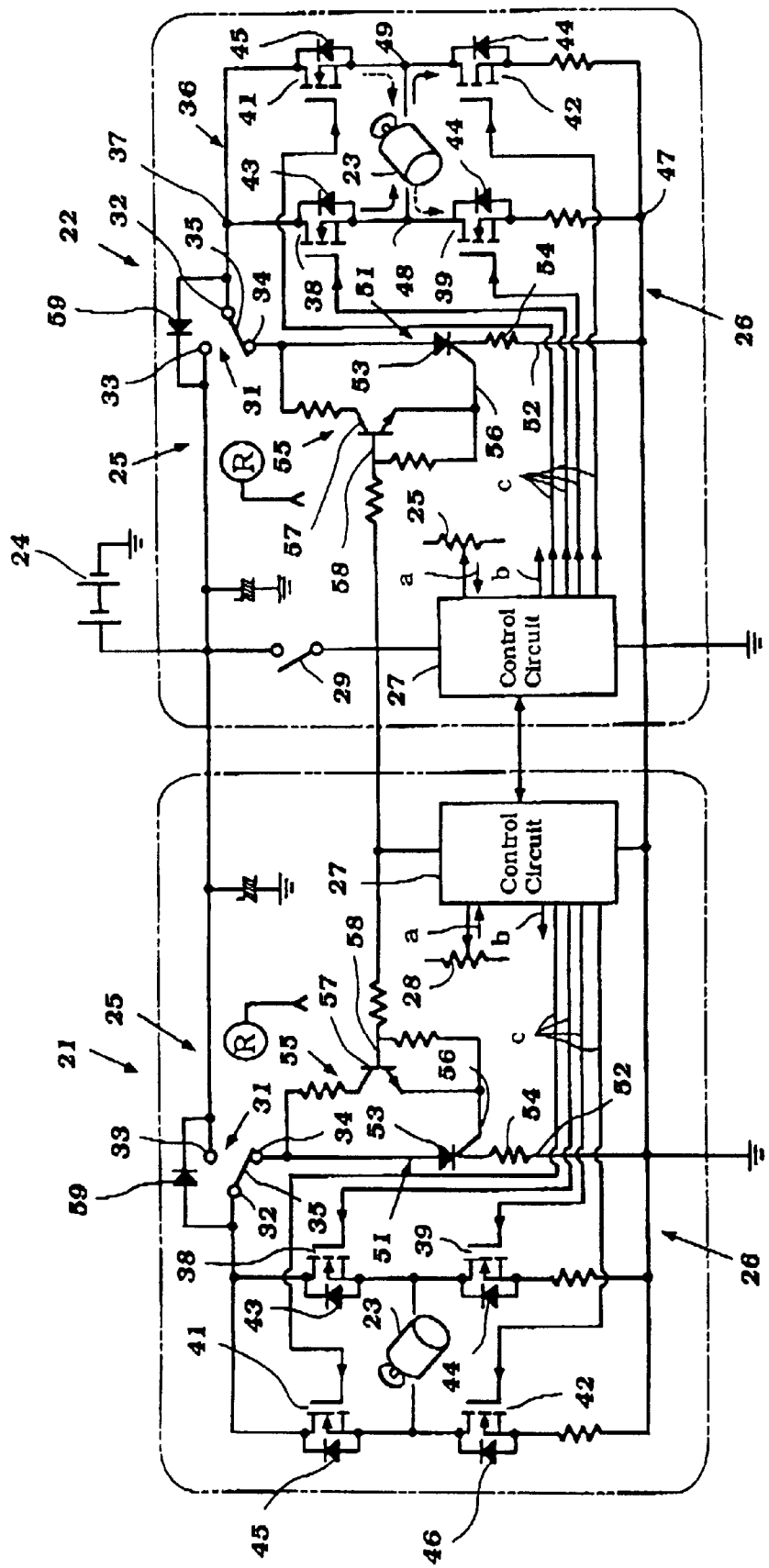
FIG. 1 is an electrical diagram showing a control system for a vehicle constructed and controlled in accordance with a first embodiment of the invention.

Referring now in detail to the drawings and initially to the embodiment of FIG. 1, this figure illustrates an electrical control diagram for an electric motor powered vehicle. In the specific embodiment illustrated, the vehicle is a wheelchair having a left wheel 21 and a right wheel 22 each of which have a respective electric motor 23 which drives the respective wheel through a transmission of a known type.

When applied to a wheelchair or any other type of vehicle, the electric motors 23 may provide only assist power for assisting manual power applied to the respective wheels 21 and 22 through a hand rim by the rider. As has been previously noted, the invention is capable of use for applications wherein the electric motor provides such assist power or in wheelchair or other applications where the electric motor provides the sole motive power for the vehicle.

As noted, the invention described in the specific embodiments described herein relate to power assisted wheelchairs but it will be apparent to those skilled in the art how the invention can be employed in a wide variety of types of vehicles having electric motor power (either sole or assist). Also, since the invention deals primarily with the control strategy, the specific driving interrelationship of each motor 23 with their respective wheel 21 or 22 is not depicted. Also, since the basic control strategy for providing the power assist if such is the type of application is not particularly relevant to the invention, it will not be fully described. It will be readily apparent to those skilled in the art, however, how the invention can be employed in conjunction with various control systems and control strategies.

In order to simplify the overall construction, a single electric battery power source, indicated at 24 is provided and which is associated with only one of the wheels (the right hand wheel 22) in this embodiment. Power is supplied from the battery 24 to both of the electric motors 23 in an arrangement which will be described.

Each electric motor 23 has associated with it a first driving circuit, indicated generally by the reference numeral 25 and a second, regenerative braking circuit, indicated generally by the reference numeral 26. The operation of these circuits is controlled by a respective controller 27 one associated with each wheel.

The controllers 27 have associated with them controls that determine the operator demand and an operator control 28 is associated with each control 27. The operator controls 28 may constitute either joysticks moveable between a forward drive position, a neutral or stationary position and a reverse drive position and output control signals "a". Alternatively, the controllers 28 may be of the hand wheel, torque sensing type so as to operate the electrical motors 23 to provide an electric power assist in accordance with any control strategy, as aforenoted. How each of these methods can be employed with the described circuits will be described later.

A main switch 29 is in circuit between the battery 24 and the controller 27 of each unit. Normally, when the main switch 29 is closed and if the operator calls for vehicle operation by moving the controller 28 to either a forward or reverse drive mode, a relay operated switch, indicated generally by the reference numeral 31 will be activated so as to switch the condition of the control circuit, to be described, to switch the relay switch 31 to a condition wherein the motor power circuit 25 is engaged.

The relay switch 31 (R) includes a main terminal junction 32, a power transmitting terminal 33 and a regenerative braking terminal 34. A moveable contact 35 connects the junction 32 with either the power terminal 33 or the braking terminal 34. When the control circuit 27 is initially activated and the controller 28 is moved to call for vehicle operation, an output signal "b" from the controller 27 will activate the relay 31 and move the contact 35 so as to establish connection with the power terminal 33.

This energizes a H bridge circuit 36 and specifically a terminal 37 thereof. The terminal 37 is connected to two parallel circuits each containing respective, series connected FETs 38 and 39 and 41 and 42. The FETs 38, 39, 41 and 42 have cooperating parasitic diodes 43, 44, 45 and 46 so as to accommodate reverse flow. Each motor 23 is connected to junctions 48 and 49 between the FETs 38 and 39 and 41 and 42 of the respective series circuits aforenoted. Another main terminal 47 of the H bridge circuit 36 is connected to ground.

When the rider is calling for forward motion of the respective wheel either by moving a joystick or the torque sensor of the respective control 28, the controller 27 outputs control signals "c" to the gates of the FETs 38 and 42 so that their respective gates are set to a high value for a predetermined time period so as to establish a current flow through the motor 23 to drive it in a forward direction. At this time, the FETs 39 and 41 have their gate circuits set to a lower value. At shorter time intervals the settings of the gate terminals is reversed (FETs 38 and 42 low and FETs 39 and 41 high). By changing the time of the driving pulses and the interval between them, a pulse with modulation system (PWM) can be utilized so as to provide the desired driving power.

When reverse operation is called for, the FETs 41 and 39 are switched on by placing a high voltage on their gate circuits for a time period while the FETs 38 and 42 are held low. For shorter periods the conditions are reversed (FETs 38 and 42 high and FETs 41 and 39 low) Again, PWM is utilized so as to control the reverse driving power.

When the operator ceases his demand for forward or reverse driving power and returns the control 28 to its neutral condition, the control circuit 27 de-energizes the relay switch 31 even though the main switch 29 is still turned on. In this condition, the conductor 35 of the relay switch 31 establishes a connection to the terminal 34.

A gate 56 of the SCR 53 is switched by a transistor 57 so as to control the application of voltage to the gate 56. The gate 58 of the transistor 57 is connected to the battery 24 for switching the transistor 57 to an "on" condition when the main switch 29 is closed and to switch the transistor 57 "off" when the main switch 29 is opened. Thus when the main switch 29 is on and the control 28 is in neutral, the relay switch will be in the condition shown in FIG. 1 and regenerative braking is provided.

If in the application of a electric motor drive for the vehicle, the operator returns the controller 28 to its neutral position, the operation of the motor 23 will be discontinued because the FETs 38 and 41 and 39 and 42 will be switched on for equal time intervals and in equal amounts.

Thereafter if the control 28 is moved from its neutral position to call for either forward or reverse motion, the FETs 38 and 42 and 39 and 41 will be activated in the manner previously described so as to provide the appropriate direction of drive utilizing the PWM as has also been described.

Referring now to the regenerative braking circuit 26, this includes a shunt line actuating circuit, indicated generally by the reference numeral 51 which controls the opening and closing of a shunt circuit 52 that is interconnected across the H terminal junctions 37 and 47 and when the relay switch 31 is positioned so that the conductor 35 contact the terminal 34. An SCR switch 53 controls the passage of current through the shunt circuit 52 and specifically a load resistor 54 therein.

This SCR 53 is switched by a control arrangement, indicated generally by the reference numeral 55 and which functions so as to permit the actuation of regenerative braking in response to operator demand. In addition this regenerative braking is effected under conditions when there is a defect sensed in the control system by the controllers 27 in the manner to be described. The system operates so that when one wheel is braked the other wheel will automatically be brake during these automatic braking operations. In addition, the control arrangement 55 operates so as to release the braking system 26 when the vehicle comes to a halt so that it can be pushed without drag from the regenerative braking system 26.

If when the main switch 29 is turned on the control unit 27 senses a failure in the system or some malfunction, which can be checked in any known manner, each controller 27 discontinues the signal b to the respective relay switch 31 to deenergize it. In the deenergize state as already noted, the conductor 35 is moved to contact the terminal 34 and hence, the shunting circuit is then completed across the H circuit junctions 37 and 47. The transistor 55 will be turned on, however, since the battery voltage is still applied to the gate 58. Therefore the gate 56 of the SCR 53 will be applied with the generated voltage so that current will flow through the shunting circuit 51 and through the resistor 54 to generate a braking force which will cause the vehicle to decelerate. This continues until the vehicle stops.

Even though, if for some reason, the battery 24 becomes defective or if its cable is removed from the terminal someway when the vehicle is traveling, since the main switch 29 is still turned on, the braking circuit 51 will still be energized. This is because a voltage will be generated which is transmitted across a diode 59 so as to supply power to the control circuit 27 since the main switch 29 is still on and also so as to switch the transistor 57 on. The generated voltage turns the gate 56 of the SCR 53 on so that current will flow through the shunting circuit 51 and through the resistor 54 to generate a braking force which will cause the vehicle to decelerate. This continues until the vehicle stops. Thus, even though the main power has been cut off due to the malfunction, the braking system will operate until the vehicle stops.

By turning the main switch off when the vehicle stops, the transistor 57 will be switched off and the braking circuit will be opened so that there will be no drag resisting the pushing of the vehicle. In fact, at any time when the vehicle is stationary and the main switch 29 is opened, then the relay 31 will be returned to the state shown in FIG. 1 and the vehicle can be pushed because the shunting circuit 52 will be open since the transistor 57 will not be switched on. Thus, the wheelchair or vehicle can be easily pushed without drag from the motor 23 through the braking circuit 26.

If during the time when the vehicle is coasting in either a forward or reverse direction and the main switch 29 is opened, the braking circuit will remain energized until the vehicle stops because of the fact that a voltage is generated through the shunting circuit 52 and the SCR 53 once switched on will remain on until the voltage drops because of the stoppage of the vehicle. After that, however, the shunting circuit will open and pushing of the vehicle is possible.

Because of the fact that the gate 56 of the SCR 53 is indirectly turned on and off with the power source voltage through the transistor 57, it is possible to have the braking forces applied or released without long power cables even if the motor driving circuits for both wheels are disposed at a substantial distance from each other. This simplifies the overall construction.

Once the vehicle is at rest, opening of the main switch 29 will switch off the SCR 53 and the regenerative braking circuit 26 will be opened and the wheelchair can be freely moved. Thus, any time the main switch 29 is open pushing is easily possible and complicated de-clutching mechanism between the motors 23 and the driven wheels is not necessary.

Figure 2:
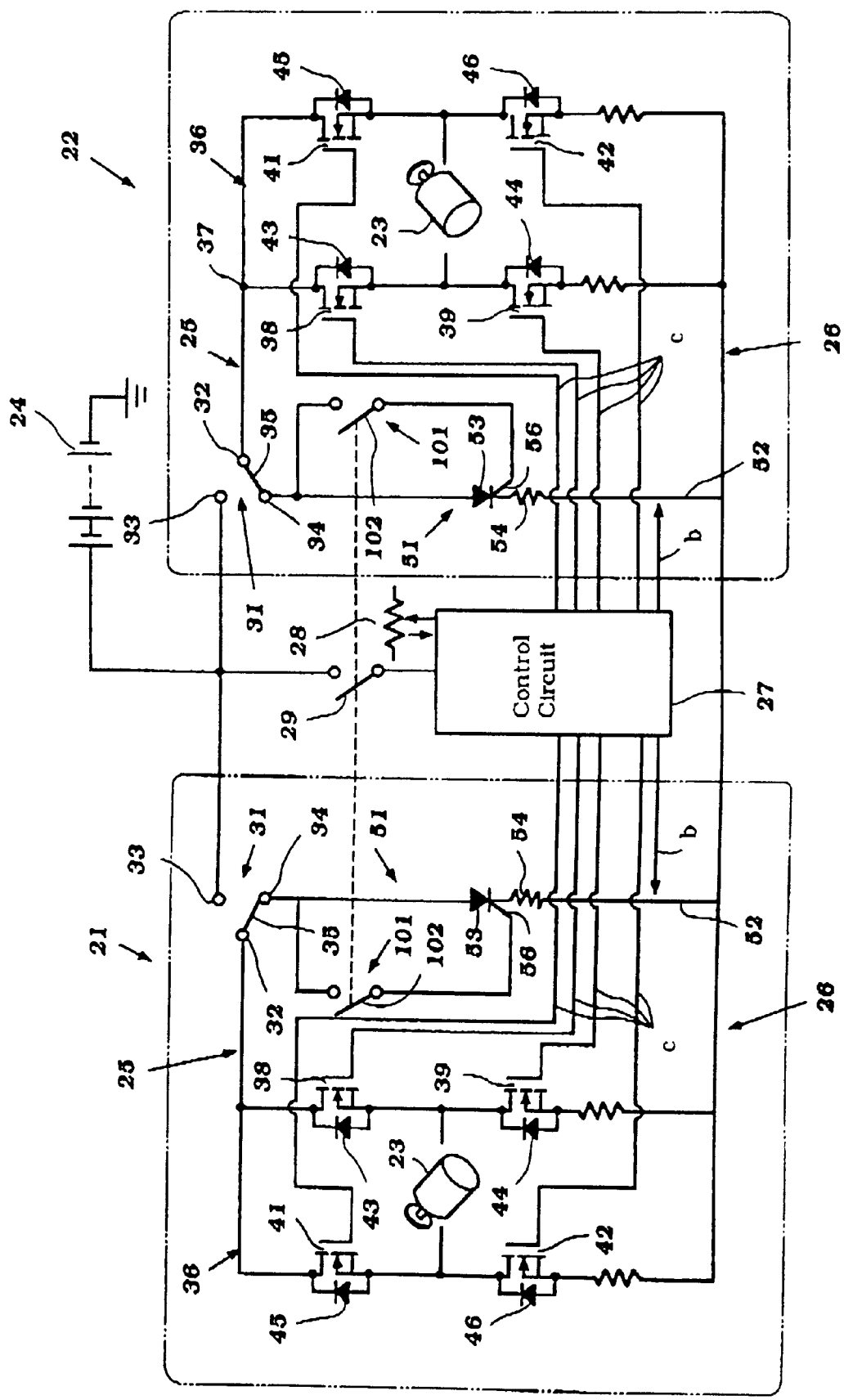
FIG. 2 is an electrical diagram, in part similar to FIG. 1, and shows a second embodiment of the invention.

In the embodiment as thus far described, the regenerative braking circuit 26 has been enabled and disenabled by the control of the shunting circuit 51 by the SCR 53 and switching transistor 55. Other arrangements can be employed for enabling or disenabling the shunting circuit 52 and FIG. 2 shows another arrangement which is simpler in construction from that already described. This system also utilizes only a single controller 28 and control circuit 27 for both wheels.

Because the only main electrical difference is in the way the shunting circuit 52 is enabled or disenabled, and all other components are the same, only the shunting circuit control will be described. Components of this embodiment which are the same as that previously described have been identified by the same reference numeral. These components will be described again only insofar as is necessary to understand the construction and operation of this embodiment.

In this embodiment, the regenerative braking circuit 26 is again controlled by a control unit, indicated generally by the reference numeral 51. This control unit also employs the SCR 53 and its gate 56. However, the transistor 57 of the previous embodiment is replaced in this embodiment by a switching arrangement, indicated generally by the reference numeral 101 for enabling or disenabling the regenerative braking circuit 26.

This switching device is comprised of a single switch 102 for each wheel 21 and 22. The switch 102 connects the gate 56 of the SCR 53 to the terminal 34. The switch 102 is coupled mechanically to the main switch 29 or is operated by a relay energized by the main switch 29 so that the switches 29 and 102 will be always in the same state as each other. Hence, when the main switch 29 is closed to energize the relay 31 and move the contact 34 into contact with the terminal 33 to connect the battery power for energizing the motor driving circuit 25, the SCR 53 will be turned off. But, when the controller 27 senses a malfunction, the relay 31 will again be switched to contact the terminal 34.

Thus, the continued rolling motion of the vehicle will cause the motors 23 to be rotated and they will generate a voltage that is transmitted through the respective FETs to the shunting circuit which will still be retained energized due to the fact that the main switch 29 and the controlling switch 102 are in their closed positions. Thus, a braking force will be generated to bring the vehicle to a halt.

Once the vehicle stops upon opening of the main switch 29 the switch 102 will also open and cause the SCR 53 to be switched off so that there will be no braking force and the vehicle can again be pushed easily.

Figure 3:
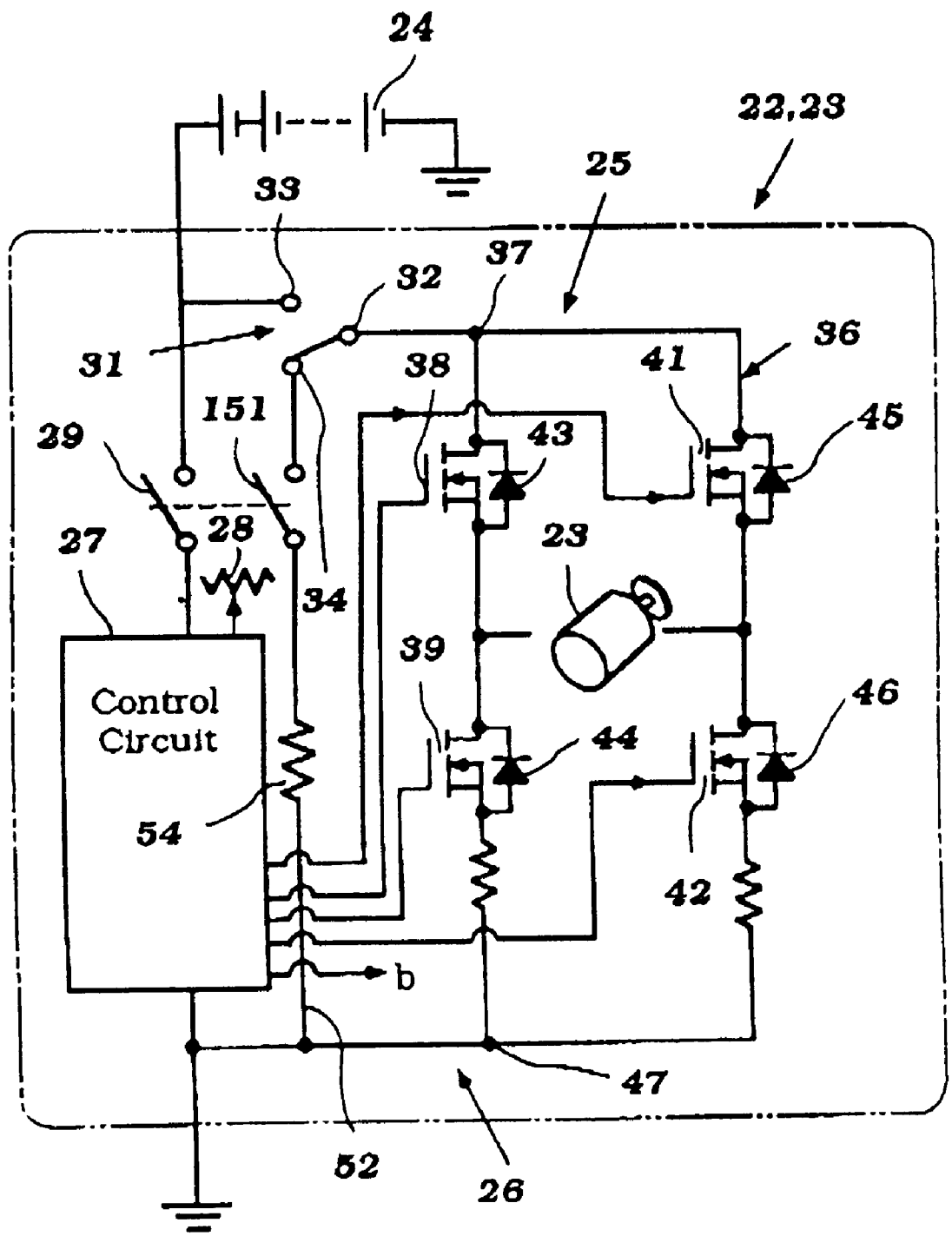
FIG. 3 is an electrical diagram, in part similar to FIGS. 1 and 2, and shows a third embodiment of the invention.

FIG. 3 shows a still further embodiment of the invention that employs only a single mechanical switch, indicated generally by the reference numeral 151 for the control of the regenerative braking circuit 26. This switch 151 replaces the SCR 53 in the shunting line 52 of the previous embodiments. The switch 151 is coupled to be operated simultaneously with and in the same state as the main switch 29.

Also, this embodiment utilizes only a single electric motor 23 which may either drive only one wheel of the associated vehicle or may drive more wheels through a differential mechanism. Hence, this device is of a type that can be easily retrofitted to purely manually operated vehicles to convert them into either electric assist or full electric drive.

When the main switch 29 is turned on, if the control unit 27 senses a failure in the system, it turns the relay switch 33 off. In this condition, as seen in FIG. 3, the shunting circuit 52 is closed and the discontinuance of the power application to the motor 33 through the drive circuit 25 is initiated. As a result, the motion of the vehicle will cause the motor 23 to turn and the regenerative braking 26 will be energized to bring the vehicle to a halt. Once the vehicle stops, the operator should open the main switch 29 in order to permit the vehicle to be pushed without drag from the motor 23.

Thus, it should be apparent from the foregoing description that the described embodiments of the invention are very effective in providing automatic braking upon the sensing of a failure in the system. In addition, they permit the vehicle to be pushed without drag from the motor once the vehicle has been stopped. Of course, the foregoing description is that of preferred embodiments of the invention and various changes and modifications may be made without departing from the spirit and scope of the invention, as defined by the appended claims.

We claim:

1. A motor control system for an electric power driven vehicle comprised of an electrical power source, an electric motor for powering a propulsion device of said vehicle for applying a driving force to said propulsion device, a control for selectively coupling said electric motor and said electric power source in a first driving mode for powering the electric motor to drive said propulsion device and a regenerative braking mode for generating a regenerative braking to the motion of said vehicle, means for sensing a malfunction in said system, means for placing said control in the regenerative braking mode in the response to a failure in said system for bringing the vehicle to a halt and disabling means for placing said control in a mode where the regenerative braking is disabled so that there will be no regenerative braking resistance to manual moving of said vehicle after it has been halted by the regenerative braking due to the failure.

2. A motor control system as set forth in claim 1, further including means for automatically disconnecting the connection of the electric power source to the electric motor in the response to the sensing of the failure.

3. A motor control system as set forth in claim 1, wherein the regenerative braking is provided by a shunting circuit across the electric motor.

4. A motor control system as set forth in claim 3, wherein the shunting circuit is opened and closed by a solid state switching device.

5. A motor control system as set forth in claim 4, wherein a relay switch selectively connects the electric motor to the electric power source or the shunting circuit.

6. A motor control system as set forth in claim 5, wherein the relay switch is normally biased to connect the electric motor to the shunting circuit and is engaged with the electric power source only when no defect is sensed.

7. A motor control system as set forth in claim 6, further including a circuit for maintaining the solid state switching device in a conducting condition by the regenerated electric power from the electric motor during the braking of the vehicle and to render the solid non-conductive when the vehicle stops so that the vehicle can be pushed without load from the motor once the vehicle stops.

8. A motor control system for an electric power driven vehicle comprised of an electrical power source, an electric motor for powering a propulsion device of said vehicle for applying a driving force to said propulsion device, a control for selectively coupling said electric motor and said electric power source in a first driving mode for powering the electric motor to drive said propulsion device and a regenerative braking mode for generating a regenerative braking to the motion of said vehicle, means for sensing a failure in said system, and means for enabling the regenerative braking mode upon the sensing of a failure and only until the vehicle is brought to a halt and thereafter releasing the regenerative braking mode so that the vehicle can be moved manually without drag from the electric motor.

9. A motor control system as set forth in claim 8, wherein the regenerative braking is provided by a shunting circuit across the electric motor.

10. A motor control system as set forth in claim 9, wherein the shunting circuit is opened and closed by a solid state switching device.

11. A motor control system as set forth in claim 10, wherein a relay switch selectively connects the electric motor to the electric power source or the shunting circuit.

12. A motor control system as set forth in claim 11, wherein the relay switch is normally biased to connect the electric motor to the shunting circuit and is engaged with the electric power source only when no defect is sensed.

13. A motor control system as set forth in claim 12, further including a circuit for maintaining the solid state switching device in a conducting condition by the regenerated electric power from the electric motor during the braking of the vehicle and to render the solid non-conductive when the vehicle stops so that the vehicle can be pushed without load from the motor once the vehicle stops.

* * * * *